(12) United States Patent
Bettinger et al.

(10) Patent No.: US 11,806,634 B2
(45) Date of Patent: Nov. 7, 2023

(54) CONNECTION SYSTEM FOR SUSPENDED LOADS FOR RIDE SYSTEMS

(71) Applicant: TAIT TOWERS MANUFACTURING, LLC, Lititz, PA (US)

(72) Inventors: Matthew Steven Bettinger, Pine Grove, PA (US); Nicholas James Bonsell, Lititz, PA (US); Andrew Phillips Mudie, Lititz, PA (US); Andrew John Penney, Lancaster, PA (US); James Fowler Shumway, Jr., Lancaster, PA (US); McLane Walker Snow, East Petersburg, PA (US)

(73) Assignee: Tait Towers Manufacturing, LLC, Lititz, PA (US)

( * ) Notice: Subject to any disclaimer, the term of this patent is extended or adjusted under 35 U.S.C. 154(b) by 318 days.

(21) Appl. No.: 17/390,304

(22) Filed: Jul. 30, 2021

(65) Prior Publication Data
US 2023/0029823 A1 Feb. 2, 2023

(51) Int. Cl.
*A63J 5/12* (2006.01)
*A63G 31/02* (2006.01)
*G06F 3/01* (2006.01)

(52) U.S. Cl.
CPC .............. *A63G 31/02* (2013.01); *G06F 3/011* (2013.01)

(58) Field of Classification Search
CPC ....... A63J 5/00; A63J 5/02; A63J 5/12; H04N 5/04; H04N 5/655; H04N 21/4104; H04R 5/02; A63G 31/02; A63G 9/02

USPC ....................................................... 472/75–84
See application file for complete search history.

(56) References Cited

U.S. PATENT DOCUMENTS

| | | | |
|---|---|---|---|
| 4,850,896 A | 7/1989 | Smith et al. | |
| 5,421,783 A | 6/1995 | Kockelman et al. | |
| 5,980,256 A | 11/1999 | Carmein | |
| 8,005,570 B2 | 8/2011 | Gloden et al. | |
| 11,627,244 B1 * | 4/2023 | Dhanda | H04N 23/55 348/349 |
| 2008/0194174 A1 * | 8/2008 | Marlow | A63G 31/02 446/236 |
| 2016/0001190 A1 | 1/2016 | Davis | |
| 2021/0228993 A1 * | 7/2021 | Jensen | B66D 1/46 |

* cited by examiner

*Primary Examiner* — Kien T Nguyen
(74) *Attorney, Agent, or Firm* — Saxton & Stump, LLC (57) ABSTRACT

A connector system, ride system and method for connecting and supporting a suspended load. The system includes a suspended carrier having a first connector part and a suspended load support, arranged and disposed to support a suspended load, the suspended load support having a second connector part. A first magnetic coupler is affixed to the suspended carrier and a second magnetic coupler is affixed to the suspended load support. The first magnetic coupler includes a first arrangement of magnets and the second magnetic coupler includes a second arrangement of magnets. The first arrangement of magnets is selectively arranged and disposed to provide alignment and detachable engagement to the magnets of the second arrangement of magnets. The first connector part and the second connector part releasably engage to connect the suspended carrier to the suspended load support and permit transmission of motion, power, signal and at least one utility from the suspended carrier to the suspended load support.

20 Claims, 11 Drawing Sheets

CONNECTION SYSTEM FOR SUSPENDED LOADS FOR RIDE SYSTEMS

FIELD OF THE INVENTION

The disclosure is generally related to a connector system for entertainment or amusement ride systems. More particularly, the disclosure includes a quick disconnect system for quickly and reliably connecting and supporting an entertainment or amusement apparatus, while providing motion, electricity, signal, and other utilities to the apparatus.

BACKGROUND OF THE INVENTION

Known virtual reality and amusement systems suffer from the drawback that the ride systems generally require a single, attached apparatus for passengers. The single, attached apparatus makes loading passengers into the system more difficult, as well as limiting the throughput of passengers. In addition, virtual reality and similar ride systems require power and signal connections that typically require permanent wiring preventing the use of a detachable ride apparatus. Further, known systems for disassembling or detaching a ride or amusement apparatus require the use of tools, expertise, and significant labor. Known assembly processes suffer from the drawback that process is slow and/or complicated.

Magnetic couplings are used in some industries for affixing devices to surfaces. Primarily, these devices rely solely upon the strength of the magnetic attraction to hold the devices in place. These systems suffer from the drawback that the magnet has weaker lateral attractive force permitting the magnet to be moved up or down on a metal surface thereby permitting relative movement between the surfaces. Although this adjustability may be helpful in some applications, this adjustability is not helpful when the magnets must be placed in a specific position with a specific orientation to provide support necessary for alignment of mechanical coupling mechanism.

In addition, current known quick release connectors, such as carabiners, particularly when used with respect to virtual reality or amusement systems, require a skilled and knowledgeable staff member to ensure they close completely and engage correctly to be properly used as designed. Accordingly, known quick release connectors may result in safety issues if there is a lack skilled and knowledgeable staff member.

What is needed is a connection system and apparatus and detachable ride/amusement system that is capable of quickly and reliably connecting and supporting an entertainment or amusement apparatus and does not suffer from the drawbacks of the prior art.

SUMMARY OF THE INVENTION

An aspect of an embodiment of the present disclosure includes a detachable suspended flying rig system for positioning and orienting a load support within a working space using an arrangement of cables and a connector system that aligns and engages a suspended load.

Another aspect includes a connector system for connecting and supporting a suspended load. The system includes a suspended carrier having a first connector part and a suspended load support, arranged and disposed to support a suspended load, the suspended load support having a second connector part. A first magnetic coupler is affixed to the suspended carrier and a second magnetic coupler is affixed to the suspended load support. The first magnetic coupler includes a first arrangement of magnets and the second magnetic coupler includes a second arrangement of magnets. The first arrangement of magnets is selectively arranged and disposed to provide alignment and detachable engagement to the magnets of the second arrangement of magnets. The first connector part and the second connector part releasably engage to connect the suspended carrier to the suspended load support and permit transmission of motion, power, signal and at least one utility from the suspended carrier to the suspended load support.

A further aspect includes a ride system including a suspended load. The ride system includes a connector system for connecting and supporting the suspended load. The connector system includes a suspended carrier having a first connector part and the suspended load support, arranged and disposed to support a suspended load, the suspended load support having a second connector part. A first magnetic coupler is affixed to the suspended carrier and a second magnetic coupler is affixed to the suspended load support. The first magnetic coupler includes a first arrangement of magnets and the second magnetic coupler includes a second arrangement of magnets. The first arrangement of magnets is selectively arranged and disposed to provide alignment and detachable engagement to the magnets of the second arrangement of magnets. The first connector part and the second connector part releasably engage to connect the suspended carrier to the suspended load support and permit transmission of motion, power, signal and at least one utility from the suspended carrier to the suspended load support.

A further aspect includes a method of connecting a suspended load to suspended carrier. A suspended load is provided. The suspended load is one or more of a passenger, a camera, equipment, lighting device, or a ride vehicle. A connector system for connecting and supporting the suspended load is provided. The connector system includes the suspended carrier having a first connector part and a suspended load support arranged and disposed to support the suspended load. The suspended load support includes a second connector part. The first connector part and the second connector part releasably engage to connect the suspended carrier to the suspended load support and permit transmission of motion, power, signal and at least one utility from the suspended carrier to the suspended load support. The method includes directing the first connector part and second connector part in a direction toward each other and engaging the first connector part with second connector part. Motion, power, signal and at least one utility are transmitted from the suspended carrier to the suspended load support.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is a connection system and apparatus and detachable ride/amusement system that is capable of quickly and reliably connecting and supporting an entertainment or amusement apparatus. What follows are exemplary embodiments.

An advantage of embodiments of the present disclosure includes quick coupling of a ride/amusement apparatus not requiring complicated processes or tools.

Another advantage of embodiments of the present disclosure includes the ability to transfer motion from a suspended carrier to a load support that includes motion that allows pitching, yawing and rolling motion to the load support.

Still another advantage of embodiments of the present disclosure includes initial attraction and alignment of the coupling mechanism to bring the coupling mechanism into position prior to engagement without requiring additional support.

Still another advantage of embodiments of the present disclosure includes the ability to mechanically connect the suspended carrier to the load support without requiring tight mechanical tolerances for the connector.

Still another advantage of embodiments of the present disclosure includes the ability to queue a plurality of ride apparatuses for connection to a single suspended carrier.

Still another advantage of embodiments of the present disclosure includes the ability to assemble the flying rig system in a variety of locations, with reduced space requirements for equipment.

Still another advantage of embodiments of the present disclosure includes the ability to safely attached riders, ride vehicles or equipment without the requirement of highly skilled or knowledgeable ride attendants.

Figure 1:
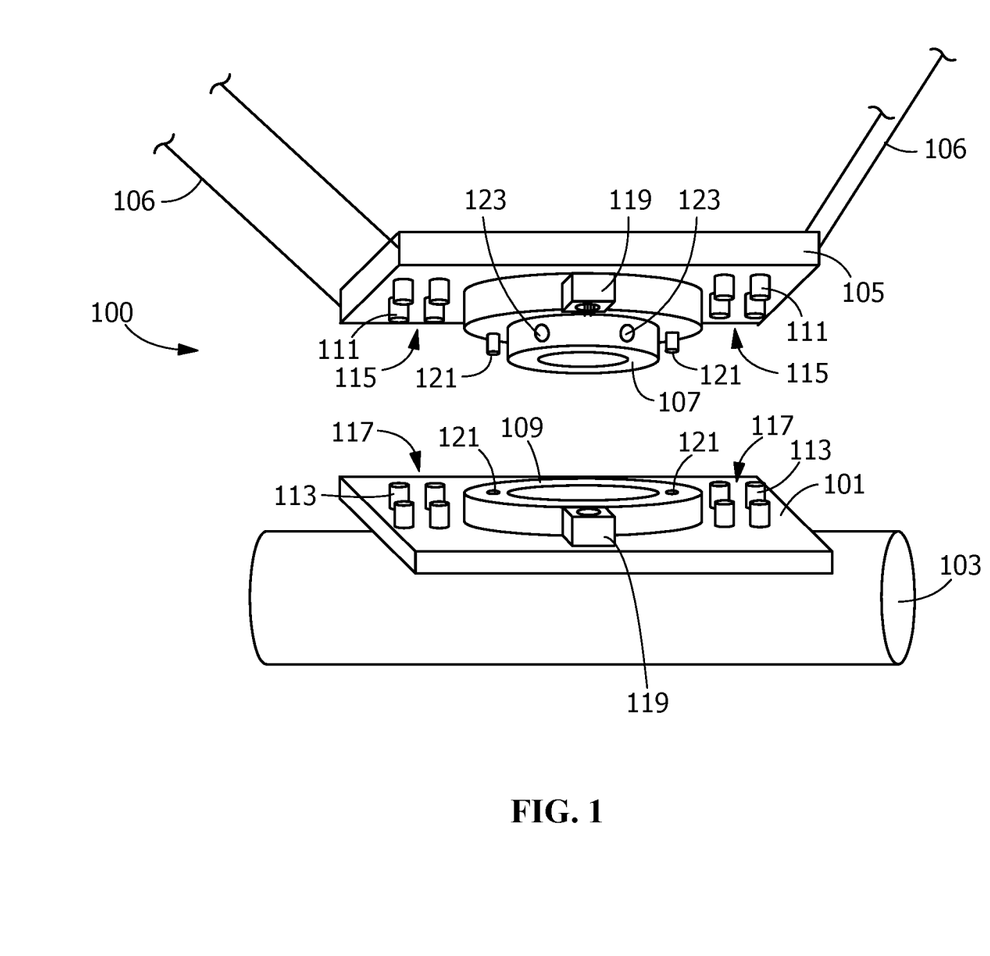
FIG. 1 shows a schematic perspective view of a connector system in a disengaged position, according to an exemplary embodiment of the disclosure.

FIG. 1 shows a connector system 100 according to an embodiment of the present disclosure in a disengaged position. The connector system 100 connects and supports a suspended load support 101 for carrying a load 103, which may include at least one passenger. In certain embodiments, the load 103 may include seating and a protective cage or enclosure. However, the load 103 that is mountable on or to the suspended load support 101 is not so limited. For example, other embodiments of the load 103 may include a camera, equipment, a lighting device, a ride vehicle, scenery or other entertainment/amusement related object that is desirably positioned and/or oriented. In one particularly suitable embodiment, the load is a human passenger suspended in such a manner to simulate flying or free-fall.

The connector system 100 includes a suspended carrier 105 having a first connector part 107. Suspended carrier 105 is suspended by cables 106. Cables 106 are elongate support members capable of supporting weight and being stored and driven, for example, on the winch assembly. Suitable structures for use as cable 106 include, but are not limited to, a wire, cable, rope, tape, ribbon or other structure, or lifting media, capable of supporting weight. The cable 106 may be synthetic or non-synthetic material. Suitable materials for cable 106 may be a metal, polymer, carbon fiber or other suitable high strength material of construction. In other embodiments, the cable 106 includes power or signal wires either integrated into the cable 106, adjacent to the cable 106 or run parallel to the cable 106 in order to provide power and/or control to the camera or other devices present as the load 103. In one embodiment, one or more of the cables 106 are configured for transmitting signals (for example, through electrical signals) to the suspended load support 101 through the connector system 100, particularly when power and/or control signals are desirable for use with the suspended load support 101 or load 103. For example, in one embodiment, the cable(s) 106 include fiber-optic interiors with a durable exterior (for example, a flexible polymeric coating or a flexible metal coating). In one embodiment, one or more of the cables 106 includes an aramid fiber (for example, a polyimide fiber). In one embodiment, one or more of the cables 106 are steel cables. In another embodiment, one or more of the cables 106 are braided Kevlar-jacketed. The cable 106 is connected to the suspended load support 101 by any suitable mechanism. Suitable mechanisms include, but are not limited to, loop and closed-hook mechanisms, connectors guided by magnets for alignment, bolts or other fasteners, and cable splices.

Power and/or signal are provided between the suspended carrier 105 and the suspended load support 101 by electrical plug segments 119 that provide electrical connection therebetween. The electrical plug segments 119 may include any suitable connector that provides low or high voltage power and/or signals. In addition, a plurality of electrical plug segment pairs may be utilized to separately provide power and signal. In addition, the connector system 100 includes utilities, such as compressed air, water, fluids, gas or other utility that is transmitted between the suspended carrier 105 and the suspended load support 101. The utilities are transmitted via utility connector 121, which includes a combination of a protrusion extending from the suspended carrier 105 that engages a corresponding opening in suspended load support 101. While FIG. 1 shows two sets of utility connectors 121, any number can be utilized to meet the needs for the load. Upon engagement of the suspended carrier 105 and the suspended load support 101, power, signal and/or utilities are provided to the load through wiring and/or piping. For example, the power, signal and utilities can be provided to load 103, when engaged, to power and control a virtual reality "VR" headset for use by the passenger, as well as providing tactile effects, such as blowing air or sprayed water. For example, the transmission of power and data may also be used to actuate haptic feedback for the VR experience. In addition, the support 101 may additionally power infrared (IR) tracking beacons for motion capture or other sensing needs.

The suspended load support 101 includes a second connector part 109. The first connector part 107 and the second connector part 109 releasably engage to connect the suspended carrier 105 to the suspended load support 101 and permit transmission of motion, power, signal and at least one utility from the suspended carrier 105 to the suspended load support 101. The first connector part 107 and the second connector part 109 engage each other in a mechanical locking arrangement, wherein engagement pins 123 of the first connector part 107 are driven axially outward into corresponding openings in the second connector part 109 (not visible in FIG. 1). While not so limited, an exemplary mechanical locking arrangement of first connector part 107 and second connector part 109 may be the mechanical locking arrangement shown and described in U.S. Pat. No. 8,005,570 B1, entitled "Robotic Tool Changer", which is hereby incorporated by reference in its entirety. Other suitable mechanical interlocking systems may be utilized in order to mechanically connect the first connector part 107 to the second connector part 109. Likewise, the geometry of the first connector part 107 and second connector part 109 are not limited and may include any suitable geometry, including, but not limited to, square, rectangular, triangular, oval, or spherical connection geometries.

In addition, connector system 100 includes a combination of a first magnetic coupler 111 and a second magnetic coupler 113 to align and detachably engage the suspended load support 101 and the suspended carrier 105 of the connector system 100. By detachably engage, as utilized herein, it is meant that the suspended load support 101 and the suspended carrier 105 are brought together with sufficient force to retain in position while a primary engagement of the first connector part 107 and second connector part 109 takes place. The first magnetic coupler 111 is affixed to the suspended carrier 105 and a second magnetic coupler 113 is affixed to the suspended load support 101. The first magnetic coupler 111 and the second magnetic coupler 113 may be affixed to their corresponding structures via any suitable method. For example, the first magnetic coupler 111 and the second magnetic coupler 113 may be affixed by welding, adhesive, fastener or other attachment mechanism. The first magnetic coupler 111 includes a first arrangement of magnets 115 and the second magnetic coupler 113 includes a second arrangement of magnets 117. Suitable magnets include, but are not limited to, permanent magnets, such as, but not limited to, neodymium rare earth magnets. In addition, electromagnets may be utilized. The first magnetic coupler 111 is magnetically attractive to the second magnetic coupler 113 by inclusion of a corresponding plurality of magnets having the opposite magnetic orientation. The magnets are preferably arranged with two parallel sets of magnets, one set arranged in north-south-north orientation and the other set arranged in south-north-south orientation or a north-south orientation and a south-north orientation. As utilized hereinafter, "north" and "south" are defined as opposed magnetic poles. However, any arrangements of poles having alternatively attractive or repulsive poles may be used. In other embodiments, the magnets may be arranged in other configurations. The arrangement of the magnets allows for simple and consistent positioning and/or alignment of the suspended load support 101 and the suspended carrier 105 by limiting the orientation of the first magnetic coupler 111 and the second magnetic coupler 113 to a specific orientation. This arrangement of magnets permits an individual, such as a ride operator, to place the first magnetic coupler 111 together with the second magnetic coupler 113 by simply bringing the first coupler 111 in sufficiently close proximity to the second magnetic coupler 113 to permit magnetic attraction to engage the first magnetic coupler 111 and the second magnetic coupler 113. It is generally not necessary to preliminarily align the first magnetic coupler 111 and the second magnetic coupler 113 as the attractive and repulsive forces of the selectively positioned magnets permit consistent engagement of the first magnetic coupler 111 and the second magnetic coupler 113 in the desired orientation. The arrangement of magnets provides both attractive force and alignment of the first magnetic coupler 111 and the second magnetic coupler 113. As the first magnetic coupler 111 and the second magnetic coupler 113 are directed toward each other, the repulsive forces of like poles of the magnets repel each other, while, simultaneously the opposite poles of the magnets attract each other, permitting simultaneous attraction and alignment. The attraction and alignment of the magnetic couplers 111 and 113 permits alignment and preliminary engagement of the first connector part 107 with the second connector part 109 in order to allow the mechanical interlocking of the first connector part 107 with the second connector part 109.

Figure 2:
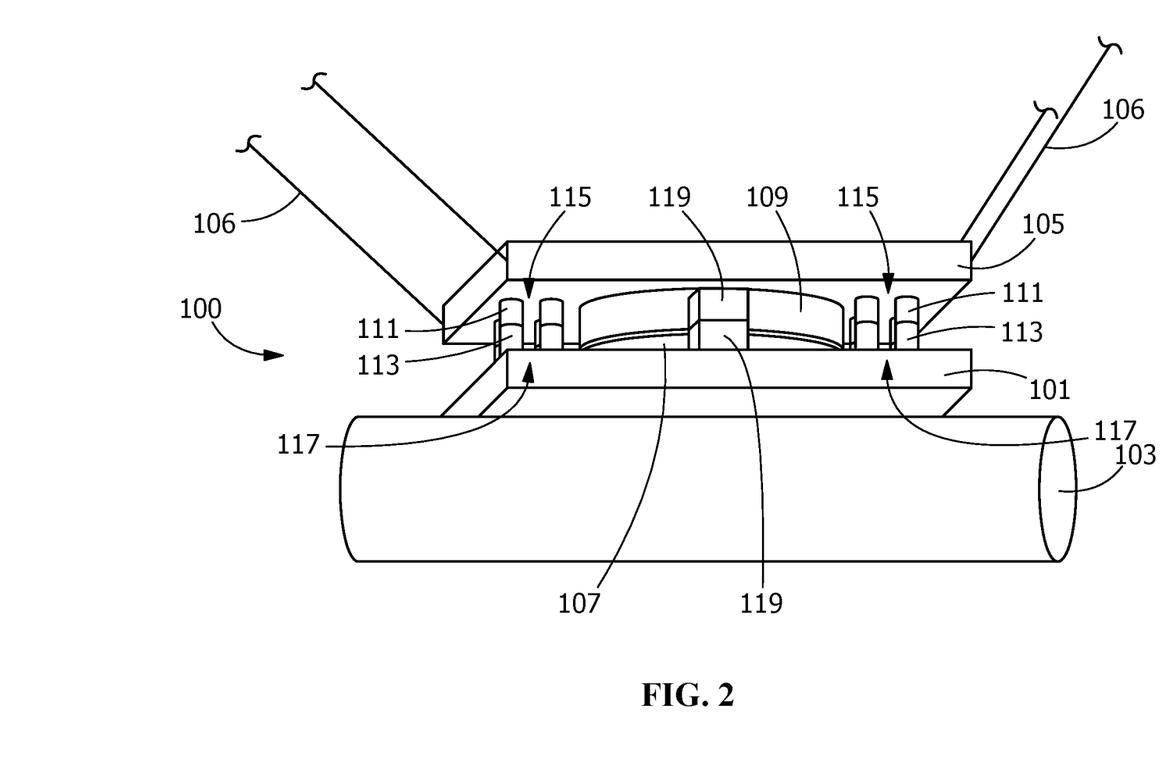
FIG. 2 shows a schematic perspective view of the connector system of FIG. 1 in an engaged position, according to an exemplary embodiment of the disclosure.

FIG. 2 shows the connector system 100 of FIG. 1 in an engaged position. As described above, first magnetic coupler 111 and second magnetic coupler 113 are engaged and aligned. In addition, the first connector part 107 with the second connector part 109 are mechanically engaged by driving engagement pins 123 from the first connector part 107 into the second connector part 109 (not visible in FIG. 2). The electrical plug segments 119 are engaged to pass power and/or signal between the suspended carrier 105 and the suspended load support 101. Likewise, the utility connectors 121 are engaged to pass utilities, such as compressed air, between the suspended carrier 105 and the suspended load support 101. The engagement between the suspended carrier 105 and the suspended load support 101 is sufficiently rigid to transmit motion between the suspended carrier 105 and the suspended load support 101. That is, forces provided to the suspended carrier 105 to provide motion are transmitted to the suspended load support 101 and allow unitary movement of the suspended carrier 105 and the suspended load support 101. For example, the connection between the suspended carrier 105 and the suspended load support 101 transfer motion from a suspended carrier to the load support 101 that includes motion that allows pitching, yawing and rolling motion to the load support 101.

While FIG. 1 shows a single set of first connector part 107 and second connector part 109, the system is not so limited and may include a plurality of corresponding first connector parts 107 and second connector parts 109. For example, the connector system 100 includes greater than one set of first connector part 107 and second connector part 109 to provide additional support points for potential redundancy and/or increased support capacity and/or increased ability to accommodate various load geometries.

Figure 3:
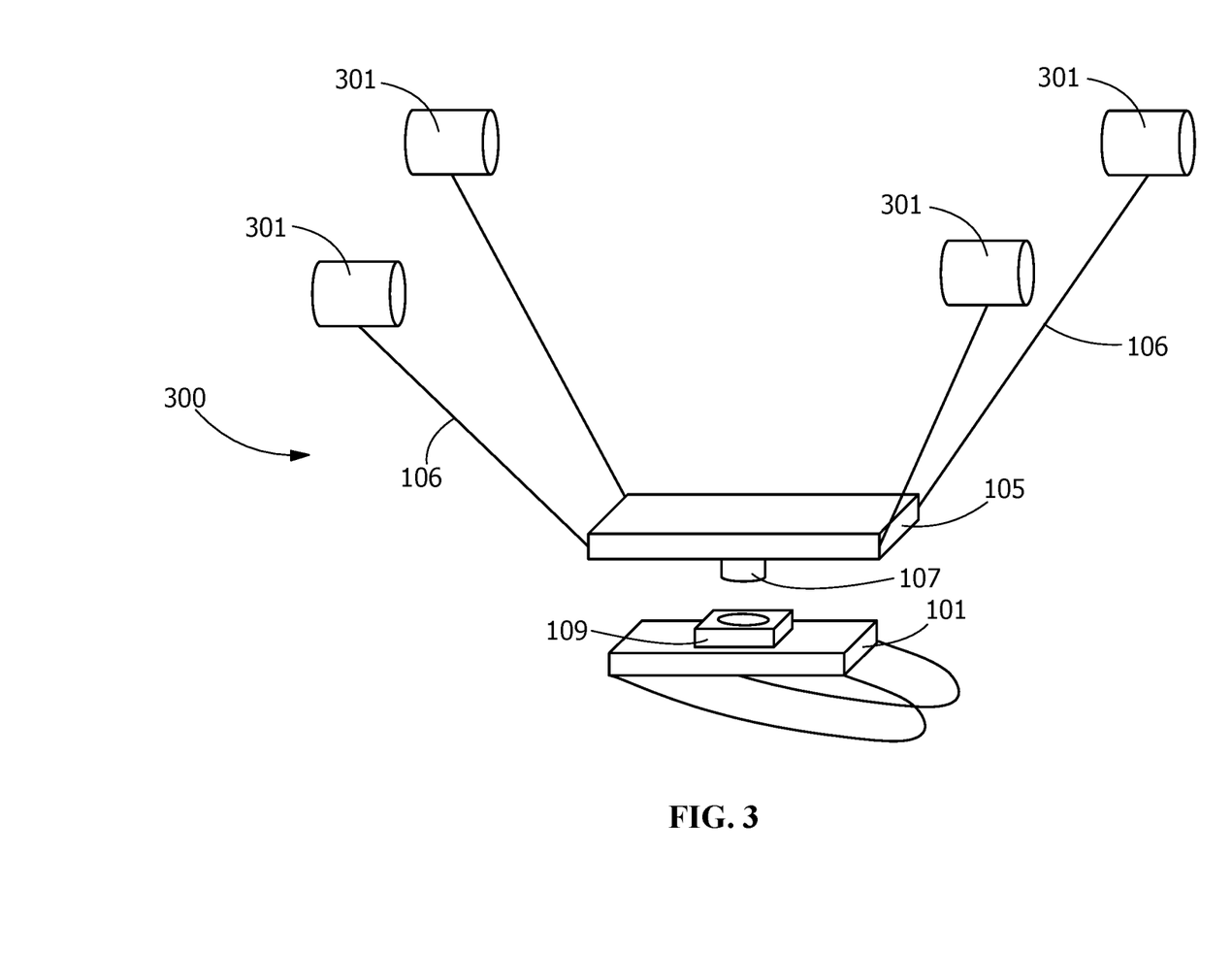
FIG. 3 shows a schematic perspective view of a ride system in a disengaged position, according to an exemplary embodiment of the disclosure.
Figure 4:
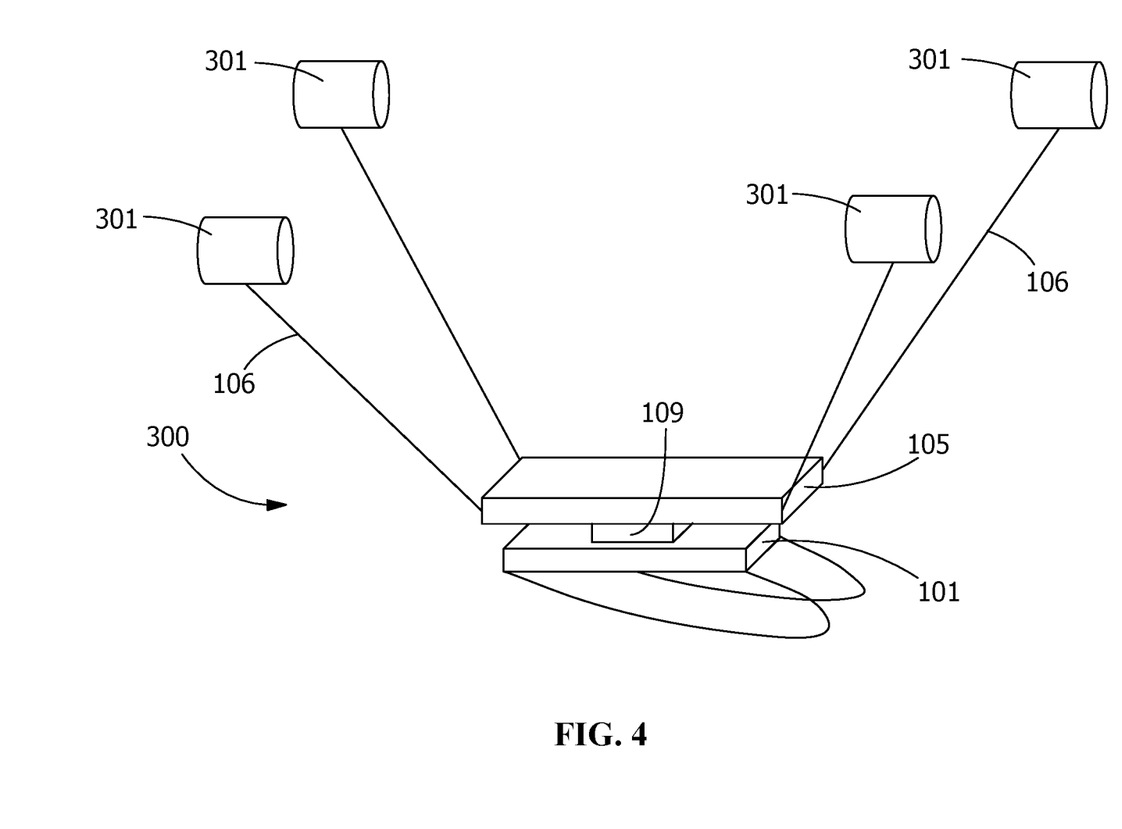
FIG. 4 shows a schematic perspective view of the ride system of FIG. 3 in an engaged position, according to an exemplary embodiment of the disclosure.

FIGS. 3-4 show a suspended flying ride system 300, according to an embodiment of the present disclosure. The flying rig system 300 may be mounted to any suitable support structure. For example, the plurality of winch assemblies 301 may be mounted to one or more support structures (see, for example, support structure 505 in FIGS. 5, 10 and 11), such as a truss, ceiling structure, beam or other suitable support. In another embodiment, one or more support structures may be freestanding structures. The winch assemblies 301 are connected to the support structure by any suitable mechanism. Suitable mechanisms include, but are not limited to, fasteners, interlocking structures, quick-release mechanisms, semi-permanent attachment devices, such as welds, or other attachment devices. The flying ride system 300 also includes a plurality of cables 106 extending from each of the winch assemblies 301 to a suspended carrier 105.

The suspended carrier 105 carries, supports, attaches to or otherwise interacts with a suspended load support 101 via the detachable connection or first connector part 107 with second connector part 109. For purposes herein, the term "securing", as in "releasably securing", is intended to include releasably carrying, supporting, attaching or otherwise interacting with suspended load support 101. As discussed above with respect to FIG. 1, the suspended carrier 105 and the suspended load support 101 are detachably connected via first connector part 107.

Motion of the suspended load support 101 and thereby load 103 is facilitated by deploying or retracting cables 106. Motions, such as pitch, roll and yaw, can be provided by selectively retracting and deploying cable 106 with winch assembly 301. The motions result as the cables 106 are independently deployed or retracted, causing independent motion in each of the pull directions. The cooperative motion in the pull directions permits a range of motion in a three-dimensional space, for example, with at least six degrees of freedom. Other motions, such as lifting, can be accomplished by selectively retracting cable 106 with winch assembly 301. Although FIGS. 1-5 depict a general dimension for a working space, the disclosure is not limited to the locations shown in the figures and movement, positioning and orientation may occur outside the working space, i.e., motion is provided generally within a three-dimensional working space, particularly if external forces are provided or actions, such as swinging or cable manipulation, are utilized. In addition, the dimensions of working space may be altered, for example, by placement of pulleys, movement of the support structure or movement of the winch assemblies.

Load 103 may be mounted on a suspended load support 101, which is moved by selective retraction and deployment of cable 106 from the plurality of winch assemblies 301. As shown in FIGS. 3-4, load 103 includes a backpack-type restraint wearable by a passenger to allow the suspension of the passenger by the suspended flying ride system 300. By retracted, retracting, retraction, or grammatical variations thereof, it is meant that cable 106 is drawn so that the length of cable 106 suspended is shortened, such as by a plurality of winch assemblies 301, as shown in FIGS. 3-4. By deployed, deploying, deployment or grammatical variations thereof, it is meant that cable 106 is extended so that the length of cable 106 suspended is increased.

A suitable winch assembly 301 is a powered winch or other device capable of retaining and retracting/deploying cable 106. One embodiment of the disclosure includes a winch assembly 301 being a powered winch having a motor, which drives a reel or set of reels which receive, store, drive or otherwise move cable 106. The arrangement of motors and reel can include any suitable arrangement known for powered winches and may include gearing, clutch assemblies, brakes, belts, chains or other structures useful for translating rotation motion from the motor to rotational motion of the reel. In addition, the reel preferably includes a helical groove or similar structure to retain cable 106. Although the above has been described with respect to a motor and reel to move cable 106, other structures may be utilized to provide movement to cable 106. The amount or length of cable 106 that is suspended may be altered by other methods, such as a non-rotation mechanical system, hydraulic cylinders, or by other actuation devices capable of altering the amount of cable 106 that is suspended. For example, portions of the cable 106 may be folded or redirected to remove a portion of the length that is suspended from the support structure onto which the winch assemblies 301 are attached. Manipulation of the length of cable 106 suspended facilitates motion of the suspended carrier 105 attached thereto.

Figure 5:
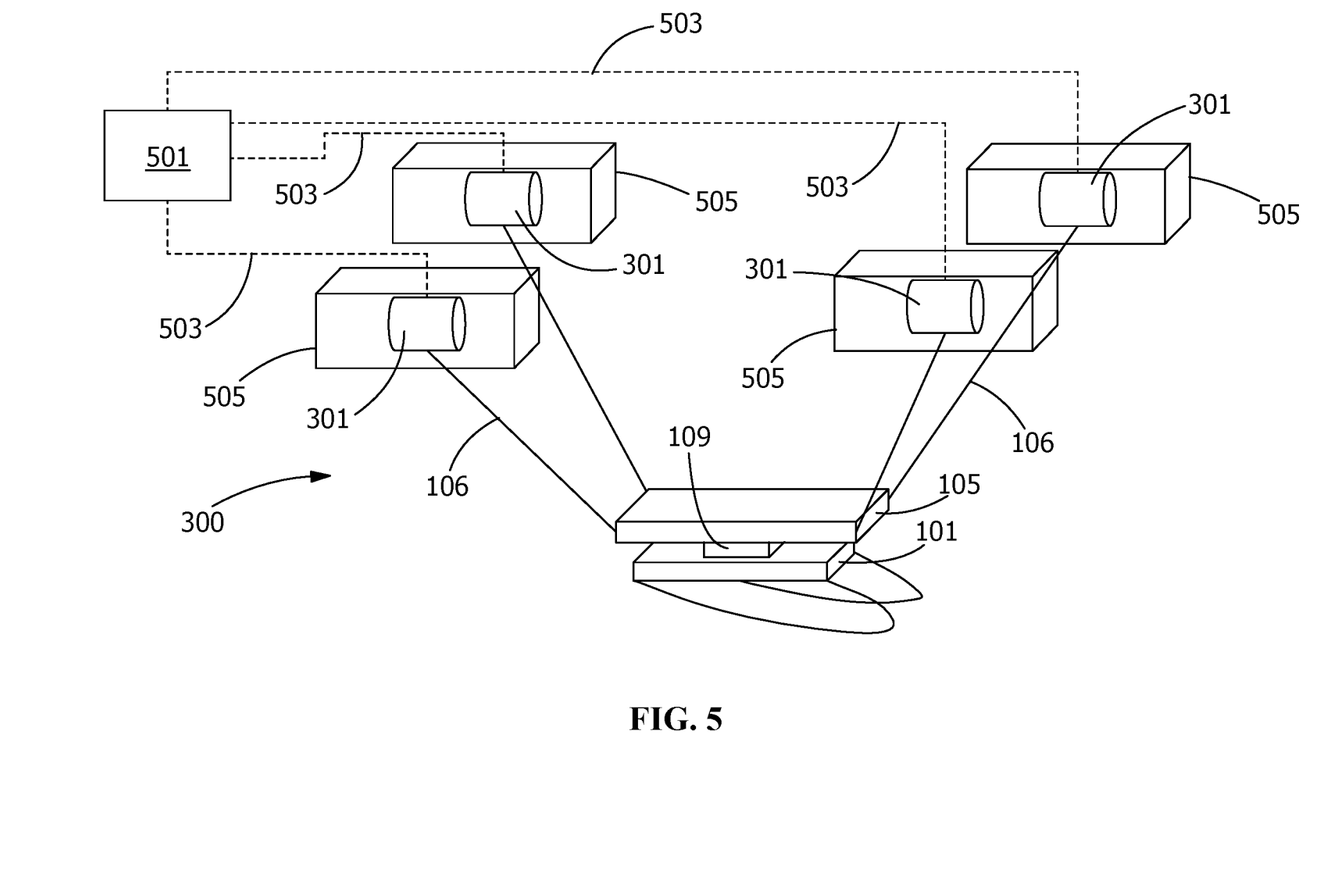
FIG. 5 shows a schematic perspective view of the ride system of FIG. 4 including a control system, according to an exemplary embodiment of the disclosure.

FIG. 5 illustrates a control system for ride system 300. As shown in FIG. 5, winch assemblies 301 are controlled by a controller 501 or other suitable control system. A suitable controller 501 or control system includes one or more microprocessors and graphical user interface that provides individual control to winch assemblies in response to the desired motion of suspended load support 101. Control lines 503 provide signals and/or power to the winch assemblies. In one embodiment, the winch assemblies 301 include control systems having microprocessors that provide control to the winch assembly 301 and retract or deploy the cable 106 in response to a signal. In another embodiment, the winch assemblies 301 may receive power and/or signals from controller 501 to retract or deploy the cable 106. The arrangement of control lines 503 may include individually run cables to the winch assemblies (as shown in FIG. 5) or may include a daisy-chain arrangement wherein the line includes a single or few branches from which connections to the winch assemblies 301 are made. The arrangement of the controller 501 may also be integrated into a large control system, such as a show or attraction, where a graphical user interface and series of microprocessors are arranged to provide centralized control of the motion of suspended load support 101.

While the above has been described with respect to winch assemblies 301 being attached to the support structures 505, such as trusses, other structures may be utilized to guide and suspend cables 106. In another embodiment, one or more pulleys may be mounted to a single support structure. The pulleys may be arranged and mounted to support the cable 106 as it is deployed or retracted by winch assembly 301. In another embodiment, the pulleys may be arranged within or on tracks or other guides that physically move the pulleys to different locations on the fly to provide dynamic re-sizing and re-shaping of the working space. Suitable pulleys include conventional pulley structures or other devices capable of rollably or slidably supporting a cable, wire or rope. While the pulleys in this embodiment are preferably free-rolling pulleys, a brake, motor or other rotation-facilitating or retarding device may be provided to pulleys to provide additional control for positioning the suspended load support 101. In these embodiments, the winch assembly 301 may be located at a location some distance from the pulley. In one embodiment, the winch assemblies 301 are located at ground level. In another embodiment, a portion of the winch assemblies 301 are mounted at ground level and a portion of the winch assemblies 301 are mounted on a support structure and cables 106 extend to the pulleys. In yet another embodiment, the winch assemblies 301 are consolidated into a single location and cables 106 extend to the pulleys to allow shorter control lines 503 and easier servicing of the winch assemblies 301.

In an exemplary embodiment, the support structure 505 may be mounted on rails or other movable assembly and configured to provide additional translational motion to the suspended load support 101. For example, the working space may be extended in this embodiment to include an extended space corresponding to the motion of the support structure. Likewise, the support structure may be rotated, lifted, lowered or otherwise moved to provide an additional range of motion to the suspended load support 101 and an extension to the working space.

Figure 6:
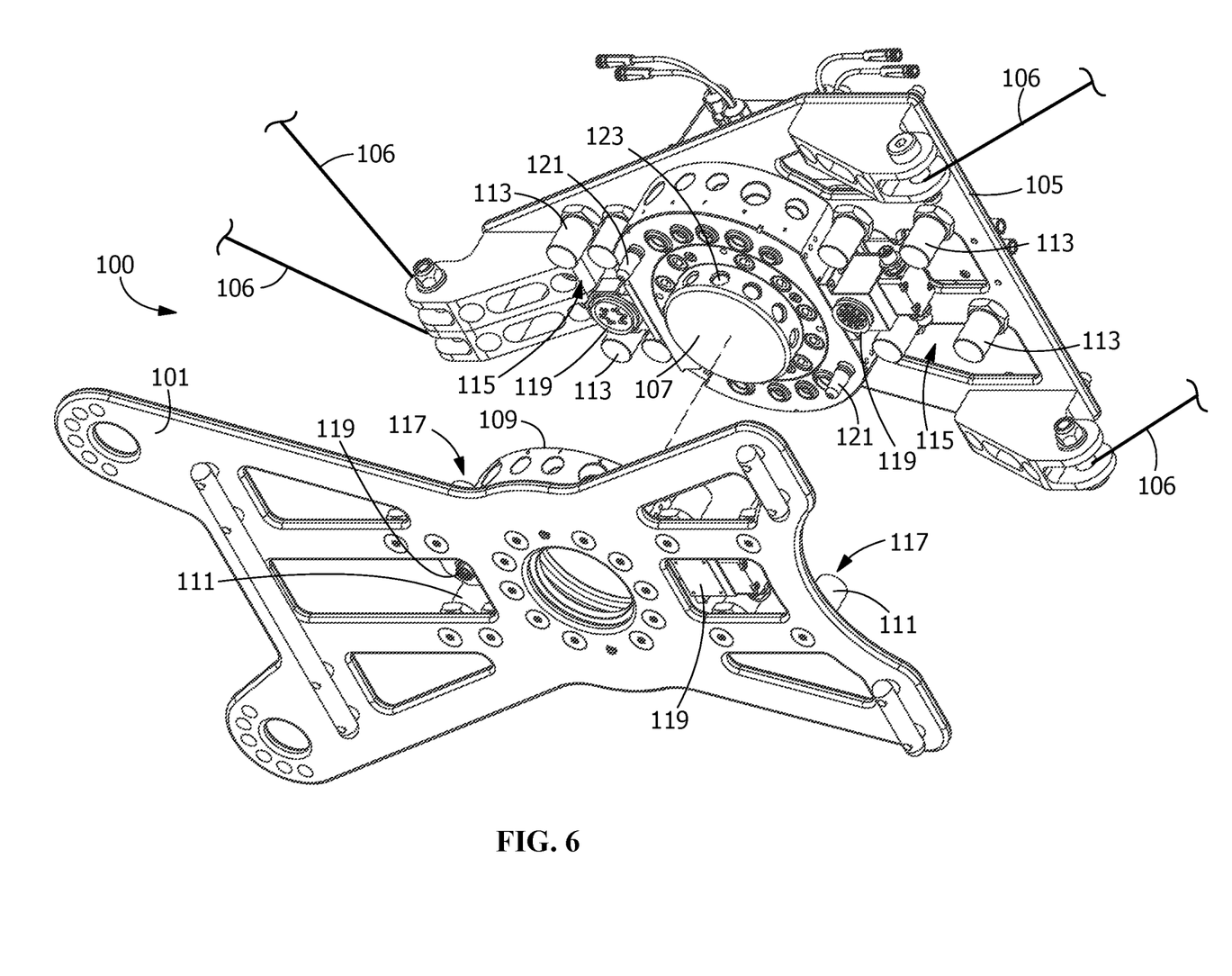
FIG. 6 shows a perspective view of a connector system in a disengaged position, according to an alternate embodiment of the disclosure.
Figure 7:
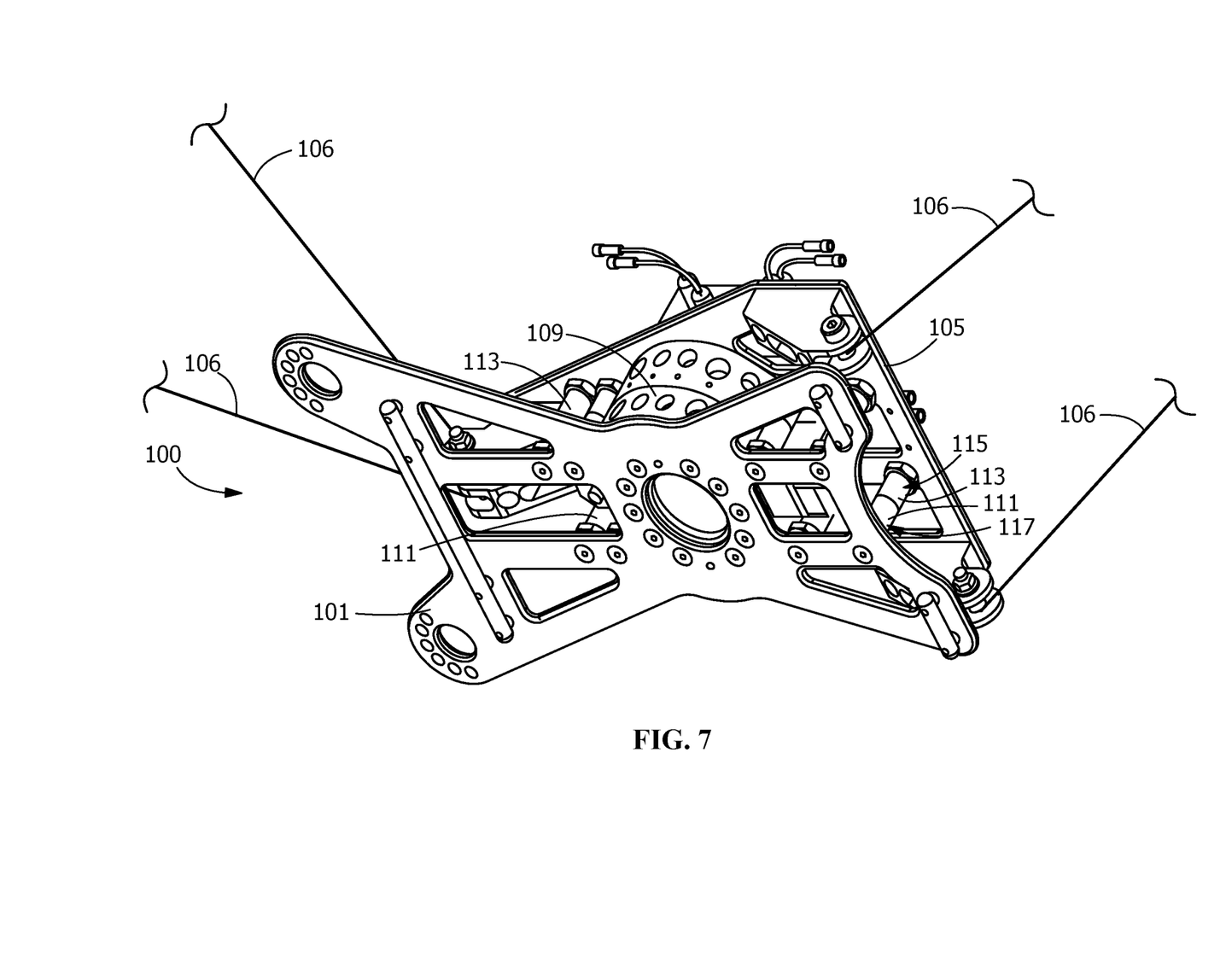
FIG. 7 shows a schematic perspective view of the connector system of FIG. 6 in an engaged position, according to an exemplary embodiment of the disclosure.

FIGS. 6 and 7 show an alternate embodiment of a connector system 100, according to an embodiment of the present disclosure. FIG. 6 shows the connector system 100 in a detached state and FIG. 7 shows connector system 100 in an engaged state. FIGS. 6-7 have the components essentially shown and described with respect to FIGS. 1-2. Specifically, FIGS. 6 and 7 show a connector system 100 that connects and supports a suspended load support 101 for carrying a load 103, which may include at least one passenger. The connector system 100 includes a suspended carrier 105 having a first connector part 107. Suspended carrier 105 is suspended by cables 106. Power and/or signal are provided between the suspended carrier 105 and the suspended load support 101 by electrical plug segments 119 that provide electrical connection therebetween. In addition, the connector system 100 includes utilities, such as compressed air, water, fluids, gas or other utility, that is transmitted between the suspended carrier 105 and the suspended load support 101. The utilities are transmitted via utility connector 121, which includes a combination of a protrusion extending from the suspended carrier 105 that engages a corresponding opening in suspended load support 101. Upon engagement of the suspended carrier 105 and the suspended load support 101 power, signal and/or utilities are provided to the load through wiring and/or piping. The suspended load support 101 includes a second connector part 109. The first connector part 107 and the second connector part 109 releasably engage to connect the suspended carrier 105 to the suspended load support 101 and permit transmission of motion, power, signal and at least one utility from the suspended carrier 105 to the suspended load support 101. The first connector part 107 and the second connector part 109 engage each other in a mechanical locking arrangement, wherein engagement pins 123 of the first connector part 107 are driven axially outward into corresponding openings in the second connector part 109 (not visible in FIG. 1). In addition, connector system 100, as shown in FIG. 6, includes a combination of a first magnetic coupler 111 and a second magnetic coupler 113 to align and detachably engage the suspended load support 101 and the suspended carrier 105 of the connector system 100. The arrangement of the magnets allows for simple and consistent positioning and/or alignment of the suspended load support 101 and the suspended carrier 105 by limiting the orientation of the first magnetic coupler 111 and the second magnetic coupler 113 to a specific orientation. This arrangement of magnets permits an individual, such as a ride operator, to place the first magnetic coupler 111 together with the second magnetic coupler 113 by simply bringing the first coupler 111 in sufficiently close proximity to the second magnetic coupler 113 to permit magnetic attraction to engage the first magnetic coupler 111 and the second magnetic coupler 113. FIG. 7 shows the connector system 100 of FIG. 6 in an engaged position. As described above, first magnetic coupler 111 and second magnetic coupler 113 are engaged and aligned. In addition, the first connector part 107 with the second connector part 109 are mechanically engaged by driving engagement pins 123 from the first connector part 107 into the second connector part 109 (not visible in FIG. 7). The electrical plug segments 119 are engaged to pass power and/or signal between the suspended carrier 105 and the suspended load support 101. Likewise, the utility connectors 121 are engaged to pass utilities, such as compressed air, between the suspended carrier 105 and the suspended load support 101. The engagement between the suspended carrier 105 and the suspended load support 101 is sufficiently rigid to transmit motion between the suspended carrier 105 and the suspended load support 101. That is, forces provided to the suspended carrier 105 to provide motion are transmitted to the suspended load support 101 and allow unitary movement of the suspended carrier 105 and the suspended load support 101. For example, the connection between the suspended carrier 105 and the suspended load support 101 transfer motion from a suspended carrier to the load support 101 that includes motion that allows pitching, yawing and rolling motion to the load support 101.

Figure 8:
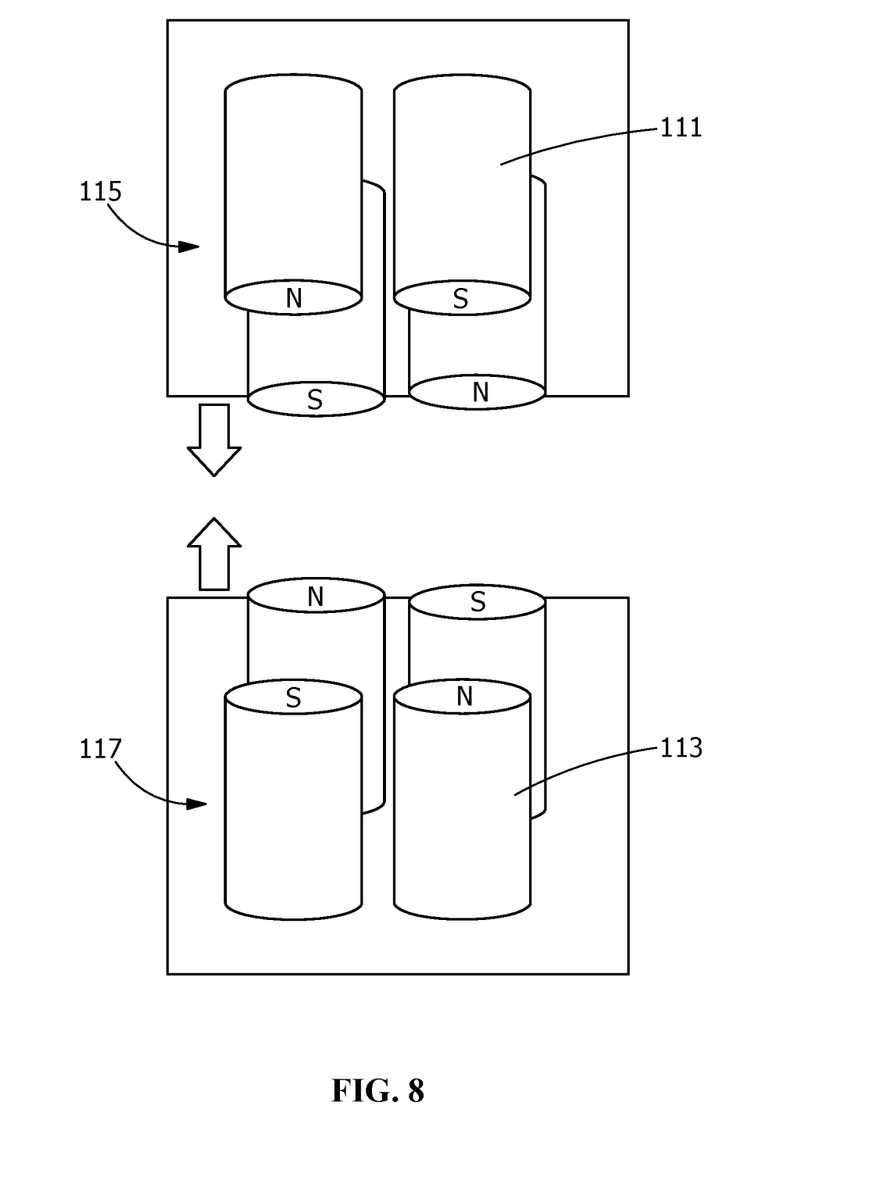
FIG. 8 shows a perspective view of a magnetic coupler system in a disengaged position showing the polarity of the individual magnets, according to an alternate embodiment of the disclosure.

FIG. 8 shows an exemplary arrangement of the first magnetic coupler 111 and the second magnetic coupler 113. The first magnetic coupler 111 is magnetically attractive to the second magnetic coupler 113 by inclusion of a corresponding plurality of magnets having the opposite magnetic orientation. The magnets are preferably arranged with parallel sets of magnets, one set arranged in north-south orientation and the other set arranged in south-north orientation.

Figure 9:
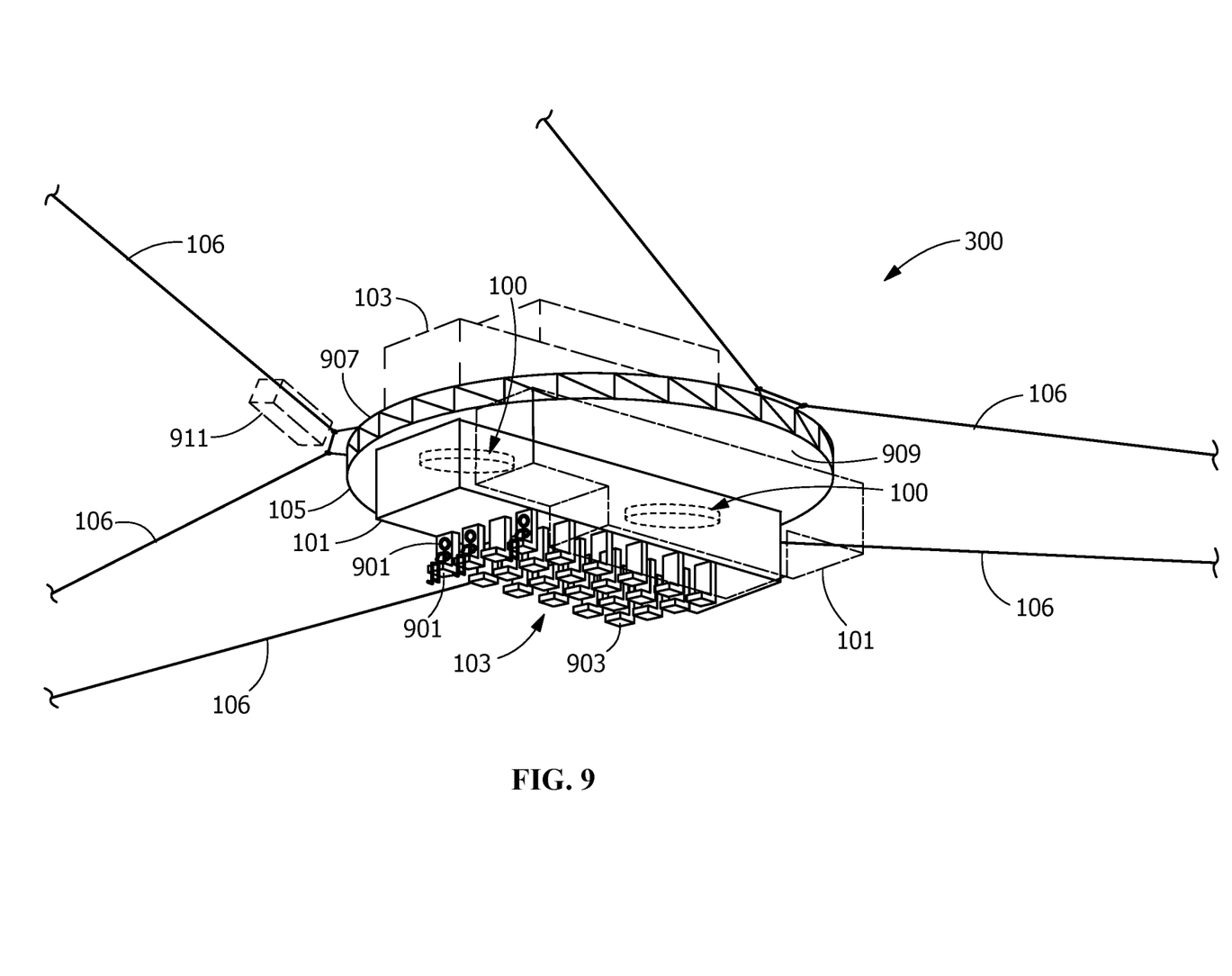
FIG. 9 shows a schematic perspective view of a ride system, according to an alternate embodiment of the disclosure.
Figure 10:
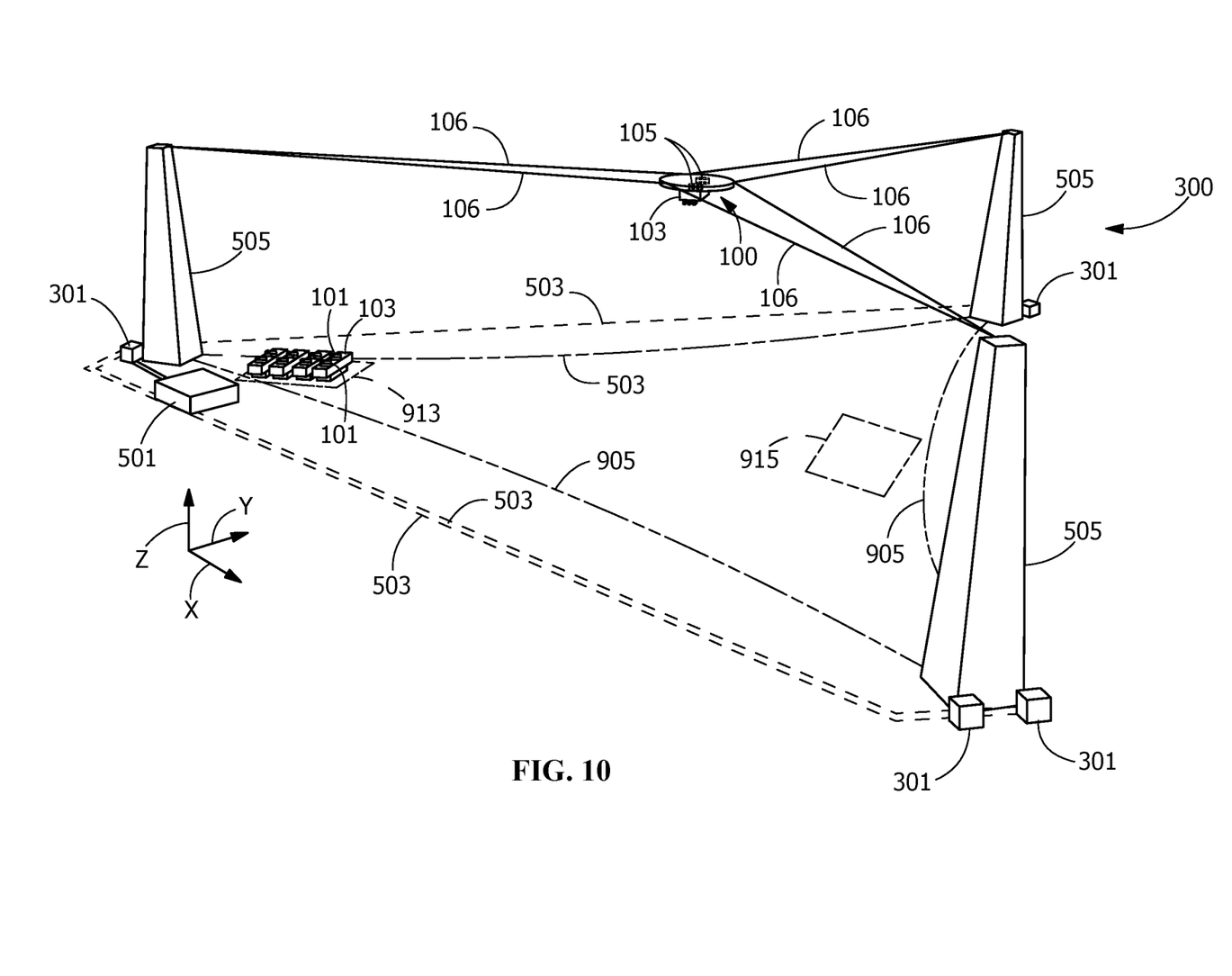
FIG. 10 shows an expanded schematic perspective view of the ride system of FIG. 9, according to an exemplary embodiment of the disclosure.

FIG. 9 shows a lower perspective view of an exemplary embodiment of the load 103 as a ride vehicle or ride car suspended from suspended load support 101, which is connected to the suspended carrier 105 by connector system 100. FIG. 9 shows the load 103 including a plurality of securing arrangements 901, such as chairs, for moving ride patrons or passengers 903 within a three-dimensional working space defined by interconnected boundary lines 905 extending in the x-y plane, the interconnected boundary lines movable in the z direction to collectively form the three-dimensional working space. In one embodiment, securing arrangements 901 may be configured for non-human riders. In another embodiment, securing arrangements 901 may be configured for cargo. Load 103 as a ride vehicle or ride car optionally includes a protective enclosure or cage (not shown) that may be at least partially transparent to enhance viewability. As further shown in FIG. 9, load 103 is releasably secured to one or both of surfaces 907, 909 of suspended load support 101. As shown in FIG. 9, the surface 907 to which a load 103 is releasably secured, is positioned at least substantially vertically above other surfaces of load support 107 when the load support is positioned substantially horizontally (see e.g., FIG. 10), while surface 909 to which a load 103 is also releasably secured, is positioned at least substantially vertically below other surfaces of suspended load support 101 when the load support is positioned substantially horizontally (see e.g., FIG. 10). Although the loads may be releasably secured to other than opposed surfaces 907, 909, and other orientations of the load support may be utilized while the load support is moving through the three-dimensional working space, such as when the system is utilized as a "thrill ride" (i.e., changing load support orientations), when the system is utilized for purposes of viewing the environment surrounding the system, it may be desirable to position the load (including riders in ride vehicles or ride cars) such as to maximize the riders' viewing experience (i.e., maximize the riders' unobscured and/or peripheral vantage point). In one embodiment (not shown) the securing arrangements 901 may be constructed such that riders' bodies can be maintained in a position that is substantially parallel to the corresponding surface of the load support to which the load is secured, thereby providing a vantage point that is substantially perpendicular to the corresponding surface of the load support. In one embodiment, the loads may be releasably secured to surfaces 907, 909 simultaneously. For example, as shown in FIG. 10, once suspended load support 101 is lowered to a desired docking position, the connector system 100 permits lifting of the load 103. That is, a surface of the suspended load support 101, such as surface 909, is either brought into abutment with a corresponding surface of load 103 such that load 103 may be releasably secured, or surface 909 is placed in a position such that load 103 can be moved in sufficiently close proximity such that load 103 may be releasably secured to the load support. In one embodiment, such as shown in FIG. 9, loads 103 are releasably secured to each of surfaces 907, 909.

As shown in FIG. 9, an extrication device 911, such as a self-propelled winch assembly, secured to a cable 106 permits the load, such as a passenger 903 or cargo, to be delivered from a ride vehicle/ride car along the cable extending between the suspended load support 101 and a support structure 505. Such an extrication device 911 may be required in the event of a malfunction associated with deployment/retraction of the cables, resulting in an inability to move suspended load support 101 from an elevated position in the three-dimensional working space from which extraction of the riders from the ground or from the air cannot be achieved. In one embodiment, in which human passengers must be rescued or extracted from the ride vehicle/ride car, one or more extrication devices 911 may be required, which may involve rescue personnel being transported from a support structure to the load support, and also including additional equipment (not shown), such as, but not limited to, straps, harnesses, clips and devices for unlocking ride vehicles/ride cars, such as for access to the riders or to disengage one or more of the ride vehicles/ride cars from the load support, and providing sufficient redundancy loading arrangements required so as to comply with applicable safety specifications and/or codes. In one embodiment, portions of the ride vehicle/ride cars containing one or more riders may be removable from the load support without requiring riders to be individually removed or extracted from the ride vehicles/ride cars. Additionally, in one embodiment, features associated with the support structures, such as enclosed steps or elevators accessible from the ground, that are also in compliance with such safety specifications and/or codes, may be incorporated into the flying rig system.

In one embodiment of suspended load support 101, at least one or both of surfaces 907, 909 are configured to interchangeably and selectably receive/secure loads 103, such as a ride vehicle or ride car. In another embodiment, at least surface 907 of suspended load support 101, as shown in FIG. 9, is configured to releasably receive/secure more than one load 103 (i.e., more than one ride vehicle or ride car).

As shown in FIGS. 9 and 10, the system may be used to move the loads 103, such as ride vehicles or ride cars, within the three-dimensional working space. FIG. 10 shows the ride system including apparatus of FIG. 9 with an arrangement of the controller 501, control lines 503, winch assemblies 301 that operate in a manner similar to that shown and described with respect to FIG. 5. In one movement path, load 103 is moved from a first position 913 into three-dimensional space, returning to first position 913. In one embodiment, this movement path may correspond to the system being used as an amusement park ride, in which the starting point and ending point of the ride (and the loads) are the same. In another movement path, load 103 is moved from the first position 913 into the three-dimensional working space to a second position 915. In one embodiment, this movement path may correspond to the system being used to transport riders, for example, from a parking lot collection area to the entrance of an amusement park. In another embodiment, this movement path may correspond to transporting riders in a congested urban setting, e.g., from a hotel to an entertainment/dining venue (or vice versa), providing a scenic view of the city between departure and destination points, without the aggravation of traffic. In another embodiment, this movement path may correspond to movement of the load 103 over a waterway or other obstacle preventing conventional overland travel, such as by automobile. In other embodiments, this movement path may correspond to different combinations of vehicles/vessels and/or land-based positions, such as between two (or more) different sea vessels, between one or more land-based position(s) and a sea vessel(s), between one or more land-based position(s) and a flying vehicle(s), such as a hovercraft, helicopter, blimp or other air vehicle capable of independently controlling its position in space (as well as air vehicles incapable of independently controlling its position in space, such as a hot air balloon), between one or more sea vessel(s) and a flying vehicle(s), between one or more land-based position(s), a sea vessel(s) and a flying vehicle(s), or any combination thereof. In one embodiment, the loads may include the movement or transfer of riders and/or cargo, or for rescue missions, such as extracting riders and/or cargo from a land-based position, or from a body of water, or from a flying vehicle. In order for the system to operate as disclosed between only two vehicles/positions, at least one of the vehicles/positions would need to include at least two support structures, such as previously discussed.

As further shown in FIGS. 9-10, the three support structures 505 are freestanding. In another embodiment, none of the support structures 505 may be freestanding. In other embodiments, one or more of the support structures 505 may be freestanding. For purposes herein, "freestanding", as in "freestanding structure", is intended to mean a structure that is not supported by another object. The term "object" is intended to include another freestanding structure. That is, a tower that may include one or more support cables is a freestanding structure. Additionally, a mass sufficiently protruding or jutting from the surrounding terrain (erected or natural formation) securable to a sheave/pulley or winch assembly 301 from which cable 106 may be deployed or retracted for use with the system as previously discussed, may be considered a freestanding structure. The support structures 505, such as the towers shown in FIGS. 9-10, are examples of freestanding structures.

Figure 11:
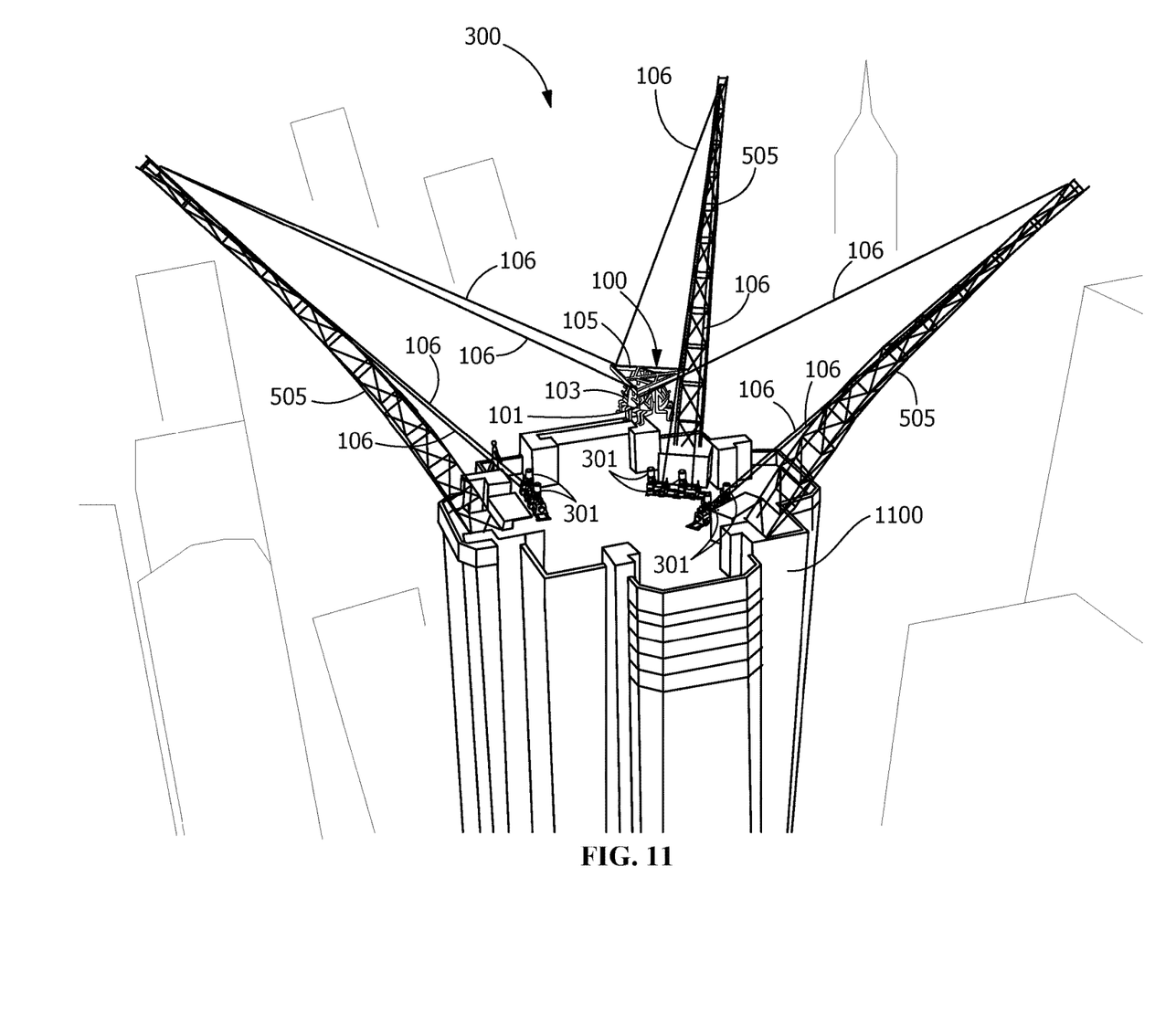
FIG. 11 shows a schematic perspective view of a ride system, according to an alternate embodiment of the disclosure.

FIG. 11 shows a suspended flying ride system 300, according to another embodiment of the present disclosure. FIG. 11 shows the load 103 as a ride vehicle or ride car suspended from suspended load support 101, which is connected to the suspended carrier 105 by connector system 100. The connector system 100 of FIG. 11 operates in essentially the same manner as shown and described with respect to FIGS. 1-4 and 9-10. In the embodiment shown in FIG. 11, the suspended flying ride system 300 is mounted to building structure 1100 and is arranged to move load 109. Load 103 is supported and moved by suspended load support 101 by cables 106. Although building structure 1100 is shown as a high-rise building in an urban setting, any suitable building structure in any suitable setting may be utilized. For example, structures to which the suspended flying ride system 300 are mounted may be permanent, portable, and/or mobile and may be utilized in an outdoor or indoor setting. In one embodiment, the suspended flying ride system 300 may be utilized to transfer the load 103, such as ride vehicles or ride cars, to other or additional flying ride systems 300 to allow greater flexibility in motion and movement, as well as provide greater ability for operation and servicing.

As shown in FIG. 11, support structures 505 extend from building structure 1100 in a plurality of directions. The support structures 505 are arranged to provide a desirable space in which to move load 103. In one embodiment, the support structures include the arrangement generally shown in FIGS. 5 and 10 with winch assemblies 301 at the base and cables 106 being fed through a pulley at a distal end. Although FIG. 11 shows the suspended flying ride system 300 with support structures mounted on a single building structure 1100, the support structures may be on two or more building structures 1100 and support load 109 therebetween. As discussed with respect to FIGS. 1-4 and 9-10, motion of the suspended load support 101 is facilitated by deploying or retracting cables 106. The motions result as the cables 106 are independently deployed or retracted, causing independent motion in each of the pull directions (see FIGS. 1-2). In one embodiment, the cooperative motion in the pull directions permits a range of motion in a three-dimensional space with at least six degrees of freedom.

As shown in FIG. 11, the deployment of cables 106 is accomplished by winch assemblies 301. As shown in FIG. 11, the winch assemblies 301 are mounted on building structure 1100 but are not so limited. Other mounting locations for the winch assemblies 301 include any suitable location for providing support and deployment of cable 106, including, but not limited to, in, on or in close proximity to support structures 505. As shown in FIG. 11, the winch assemblies 301 include two winch assemblies 301 for each support structure 505. Other arrangements of winch assemblies 301 may be utilized, provided that the cables 106 are controlled to provide the desired motion of the suspended load support 101.

In one embodiment of the present invention, ride system 300 utilizes a novel ride platform environment, which is the ride platform or load 103 that is in motion relative to real world studio environment (or the fixed outdoor location). Ride passengers wear a display arrangement, such as a virtual reality ("VR") headset worn on the head of ride passenger. In accordance with one aspect of the present disclosure, the ride system includes a ride vehicle, wherein this component of the ride system may be, for example, the load 103, and the ride vehicle being operable to support a ride passenger 903 during a ride event during which the ride vehicle travels along an event path located within a volume. The ride system additionally includes a display arrangement for displaying a viewing script or VR scenery environment to the ride passenger 903 during a ride event, wherein this component of the ride system may be, for example, the virtual reality sub-system including a headset to be worn on the head of the ride patron. The ride system 300 further includes the motive force assembly, for example, shown and described with respect to FIGS. 1-5 and 9-11, operatively connected to the ride vehicle, wherein this component of the ride system may be, for example, comprised of the cables 106, associated winch assemblies 301.

While only certain features and embodiments of the invention have been shown and described, many modifications and changes may occur to those skilled in the art (for example, variations in sizes, dimensions, structures, shapes and proportions of the various elements, values of parameters (for example, temperatures, pressures, etc.), mounting arrangements, use of materials, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A connector system for connecting and supporting a suspended load, the system comprising:
   a suspended carrier having a first connector part;
   a suspended load support arranged and disposed to support a load, the suspended load support having a second connector part; and
   a first magnetic coupler affixed to the suspended carrier and a second magnetic coupler affixed to the suspended load support, the first magnetic coupler comprising a first arrangement of magnets, the second magnetic coupler comprising a second arrangement of magnets, the first arrangement of magnets being selectively arranged and disposed to provide alignment and detachable engagement to the magnets of the second arrangement of magnets;
   wherein the first connector part and the second connector part releasably engage to connect the suspended carrier to the suspended load support and permit transmission of motion, power, signal and at least one utility from the suspended carrier to the suspended load support.

2. The system of claim 1, wherein the electricity and signal are provided between suspended carrier and the suspended load support through an electrical plug segment on the suspended carrier that engages a corresponding electrical plug segment on the suspended load support.

3. The system of claim 1, wherein the at least one utility is provided between suspended carrier and the suspended load support through a combination of a protrusion extending from the suspended carrier that engages a corresponding opening in suspended load support.

4. The system of claim 1, wherein the first arrangement of magnets and second arrangement of magnets permit the suspended carrier support to attach to the suspended load in one specific position.

5. The system of claim 1, wherein the first arrangement of magnets includes two parallel sets of magnets, wherein a first set is in north-south orientation and a second set is in south-north orientation.

6. The system of claim 1, wherein the first arrangement of magnets includes two parallel sets of magnets, wherein a first set is in north-south-north orientation and a second set is in south-north-south orientation.

7. A ride system comprising:
   a suspended load; and
   a connector system for connecting and supporting the suspended load, the connector system comprising:

a suspended carrier having a first connector part;

a suspended load support arranged and disposed to support the suspended load, the suspended load support having a second connector part; and a first magnetic coupler affixed to the suspended carrier and a second magnetic coupler affixed to the suspended load support, the first magnetic coupler comprising a first arrangement of magnets, the second magnetic coupler comprising a second arrangement of magnets, the first arrangement of magnets being selectively arranged and disposed to provide alignment and detachable engagement to the magnets of the second arrangement of magnets;

wherein the first connector part and the second connector part releasably engage to connect the suspended carrier to the suspended load support and permit transmission of motion, power, signal and at least one utility from the suspended carrier to the suspended load support.

8. The ride system of claim 7, wherein suspended load is suspended via a plurality of cables.

9. The ride system of claim 8, wherein each of the plurality of cables is retracted and deployed from a winch assembly.

10. The ride system of claim 9, wherein the winch assembly is mounted to a support structure.

11. The ride system of claim 10, wherein the support structure is a free-standing support structure.

12. The ride system of claim 7, wherein the electricity and signal are provided between suspended carrier and the suspended load support through an electrical plug segment on the suspended carrier that engages a corresponding electrical plug segment on the suspended load support.

13. The ride system of claim 7, wherein the at least one utility is provided between suspended carrier and the suspended load support through a combination of a protrusion extending from the suspended carrier that engages a corresponding opening in suspended load support.

14. The ride system of claim 7, wherein the first arrangement of magnets and second arrangement of magnets permit the suspended carrier support to attach to the suspended load in one specific position.

15. The ride system of claim 7, wherein the first arrangement of magnets includes two parallel sets of magnets, wherein a first set is in north-south orientation and a second set is in south-north orientation.

16. The ride system of claim 7, wherein the first arrangement of magnets includes two parallel sets of magnets, wherein a first set is in north-south-north orientation and a second set is in south-north-south orientation.

17. The ride system of claim 7, further comprising a plurality of corresponding first connector parts and second connector parts.

18. The ride system of claim 7, wherein the suspended load includes a passenger.

19. The ride system of claim 18, wherein suspended load support is configured to power and control a virtual reality headset for a passenger.

20. A method of connecting a suspended load to a suspended carrier comprising:

providing a suspended load, the load being selected from the group consisting of a passenger, a camera, equipment, lighting device, a ride vehicle, and combinations thereof;

providing a connector system for connecting and supporting the suspended load, the connector system comprising:

the suspended carrier having a first connector part; and a suspended load support arranged and disposed to support the suspended load, the suspended load support having a second connector part;

wherein the first connector part and the second connector part releasably engage to connect the suspended carrier to the suspended load support and permit transmission of motion, power, signal and at least one utility from the suspended carrier to the suspended load support;

directing the first connector part and second connector part in a direction toward each other and engaging the first connector part with second connector part; and transmitting motion, power, signal and at least one utility from the suspended carrier to the suspended load support.

* * * * *